April 8, 1958  J. D. FREEMAN ET AL  2,829,663
PNEUMATIC CONTROLLER

Filed July 14, 1953  4 Sheets-Sheet 1

Inventors:
John D. Freeman,
Frank Baranowski, Jr.,
by John W. Kalb
Their Attorney.

April 8, 1958 J. D. FREEMAN ET AL 2,829,663
PNEUMATIC CONTROLLER
Filed July 14, 1953 4 Sheets-Sheet 2

Fig. 2.

Inventors:
John D. Freeman,
Frank Baranowski, Jr.,
by John D. Ralls
Their Attorney.

April 8, 1958     J. D. FREEMAN ET AL     2,829,663
PNEUMATIC CONTROLLER Filed July 14, 1953     4 Sheets-Sheet 3

Inventors:
John D. Freeman,
Frank Baranowski, Jr.,
by *John W. Ralls*
Their Attorney.

United States Patent Office 2,829,663
Patented Apr. 8, 1958

2,829,663

PNEUMATIC CONTROLLER

John D. Freeman, New York, N. Y., and Frank Baranowski, Jr., Stoneham, Mass., assignors to General Electric Company, a corporation of New York Application July 14, 1953, Serial No. 367,930

6 Claims. (Cl. 137—86)

Our invention relates to improvements in pneumatic controllers, which provide an air pressure the value of which is a selected function of a measured variable.

Such controllers are widely used to control industrial processes. The measured variable may be temperature, pressure, or any other quantity which it is desired to maintain substantially at a predetermined value. The measured value of the variable is usually displayed by a recording instrument. The position of the instrument pen actuates a pneumatic controller, which controls the value of a pneumatic pressure in accordance with a selected function of the variable. This pneumatic pressure operates a suitable servomotor which controls some agency affecting the process conditions. For example, the servomotor may be a pneumatically operated valve which controls the flow of a heating agent.

The desired value of the measured variable is commonly called the "set point." The difference between the measured value of the variable and the set point is hereinafter referred to as the "error signal" and designated by the symbol E. It is usually desired that the pneumatic pressure supplied to the servomotor, designated by the symbol P, should be proportional to a selected function of E having terms respectively proportional to the value of E and to the value of a time integral of E. This is commonly called "proportional plus reset control action." The selected function may also have a term proportional to the time derivative of E, in which case the control action is called "proportional plus reset plus rate." The ideal equation for proportional plus reset plus rate control action is:

$$P = P_0 + \frac{E}{S} + \frac{R}{S}\int E\,dt + \frac{T}{S}\frac{dE}{dt}$$

where $P_0$ is the initial value of P, and S, R and T are constants of proportionality respectively known as proportional band, reset rate, and rate time. To provide a controlled suitable for use in a variety of industrial processes, S, R and T should be independently adjustable over a wide range of values.

Controllers which approximate the desired control action are already known to those skilled in the art. However, the controllers heretofore used have some or all of the following disadvantages: instability producing undesirable oscillations in the controlled air pressure under some operating conditions; a relatively large number of moving parts, causing friction and mechanical hysteresis errors, lack of ruggedness and reliability in service, and high manufacturing cost; lack of compactness; inaccessibility of parts for servicing; complexity and unreliability of air connections; lack of flexibility for use in a variety of applications; small range and interdependence of adjustments.

The principal object of our invention is to provide an improved pneumatic controller in which these disadvantages are minimized. Other objects and advantages will appear as the description proceeds.

Our invention will be better understood from the following description taken in connection with the accompanying drawings, and its scope will be pointed out in the appended claims. In the drawings.

Figure 1:
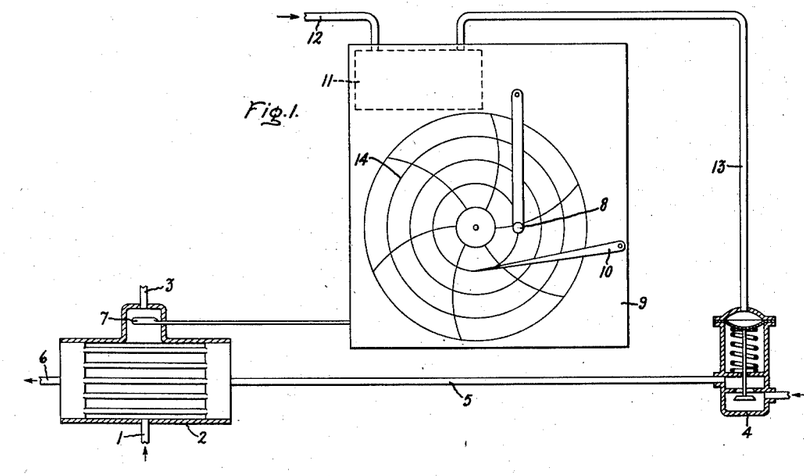
Fig. 1 is a schematic diagram of a typical pneumatic control system for a simple process.

Fig. 1 shows a typical installation for the control of a simple heating process. A fluid to be heated passes through connection 1, heat exchanger 2, and connection 3. A heating agent, which may be steam, passes through control valve 4, connection 5, heat exchanger 2, and connection 6. Control valve 4, which may be a conventional pneumatically-operated type, controls the amount of heating agent supplied to the heat exchanger. The temperature of the heated fluid is measured by a suitable detector 7, which may be of any conventional type, and the value of this temperature is displayed by the pen 8 of a conventional round-chart recorder 9. The pointer 10 is adjusted to the temperature value which it is desired to maintain, commonly called the set point.

A pneumatic controller 11 is preferably located inside the recorder case. Compressed air is supplied to controller 11 through connection 12 from any suitable source. Controller 11 regulates the pneumatic pressure supplied through connection 13 to the pneumatically-operated control valve 4. When the position of pen 8 indicates a measured temperature less than the desired set-point temperature, controller 11 increases the pneumatic pressure supplied through connection 13, which in turn opens valve 4 to a greater extent and thus permits more of the heating agent to enter the heat exchanger. Conversely, when the position of pen 8 indicates a greater temperature than the set point, controller 11 decreases the pneumatic pressure supplied through connection 13, and thus closes control valve 4 to a greater extent.

The action just described is known as direct action, since an increase in the measured variable causes the controller to increase the pneumatic pressure supplied to the control servomotor or valve. In some control systems, it is desirable that an increase in the measured variable should cause the controller to decrease the pneumatic pressure. This is known as inverse control action. Our improved controller, hereinafter described, includes a simple adjustment for providing either direct or inverse action, as desired.

In a typical installation, the compressed air supplied to connection 12 may have a pressure of 17 to 20 lbs. per sq. in. This pressure is reduced by controller 11 to a value such that the pressure in connection 13 is of the proper value to open control valve 4 by the desired amount. For example, valve 4 may be fully closed when the pressure supplied through connection 13 is 3 lbs. per sq. in., or less, and may be fully open when the pressure supplied is 15 lbs. per sq. in., or more. For intermediate values of control air pressure, valve 4 is correspondingly partially opened.

Figure 2:
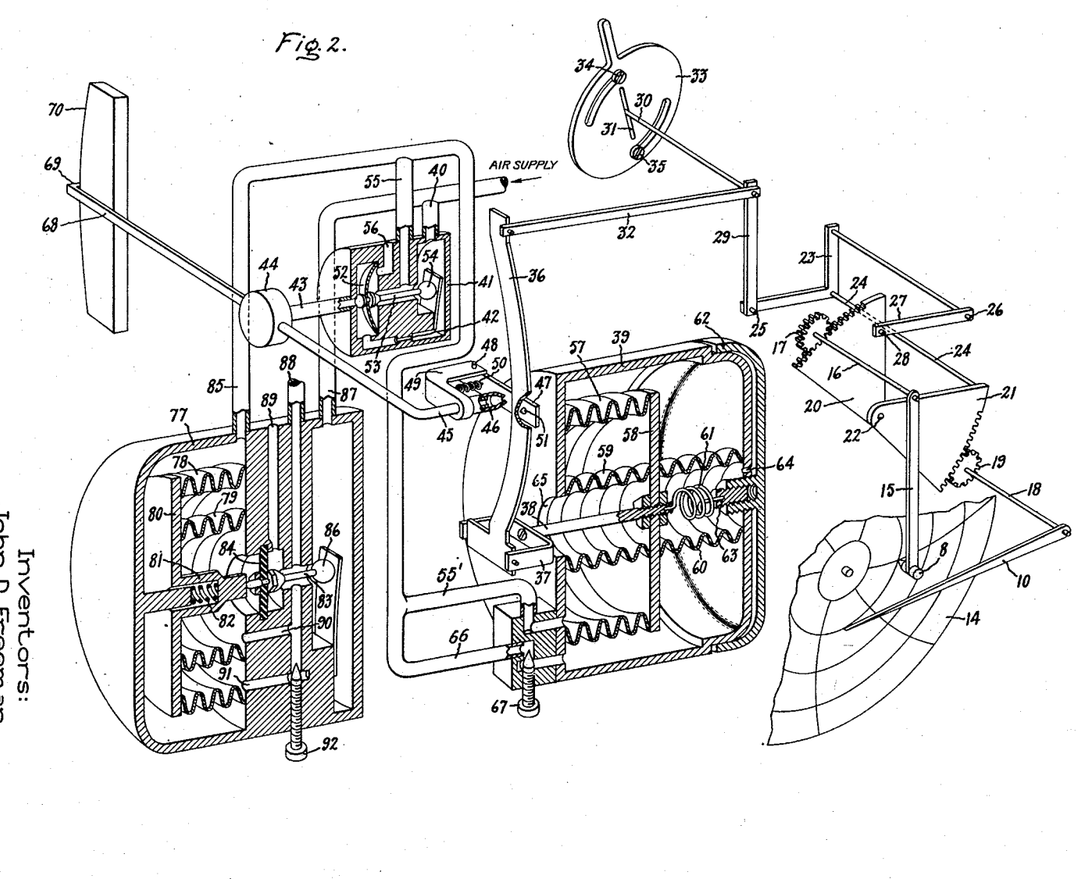
Fig. 2 is a schematic illustration, partly in section, of an improved controller embodying principles of our invention.

Fig. 2 is a schematic diagram illustrating a preferred form of the pneumatic controller 11. The pen 8 is positioned on a chart 14 by conventional recorder mechanism, not shown, to display measured values of the variable to be controlled. The pointer 10 is manually adjusted, by any suitable means, to the predetermined set-point value of the variable. Pen 8 is attached to one end of a pen arm 15 positioned by a rotatable shaft 16 carrying a pinion 17. Pointer 10 is attached to a rotatable shaft 18 carrying a pinion 19.

Two sector gears 20 and 21 are independently rotatable about a common fixed axis, such as a pin 22. Gear 20 engages pinion 17, so that its angular position corresponds to the measured value of the variable. Gear 21 engages pinion 19, so that its angular position corresponds to the predetermined set point. An angle-shaped member, or bell crank, 23, preferably right angle-shaped with arms of substantially equal length, is pivotably supported at its corner by a pin 24 attached to sector gear 21 as shown, so that pin 25 at one end of member 23 is movable along an arc passing substantially through the extended common axis 22 of the two sector gears. A pin 26 attached to the other end of member 23 is connected to sector gear 20 by a link 27 pivoted at each of its ends. Link 27 is preferably equal in length to one arm of member 23, and is pivotably attached to gear 20 by a pin 28 at a distance from axis 22 which is also equal to the length of one arm of member 23, so that the pins 22, 24, 26 and 28 are perpendicular to respective corners of a parallelogram. The length of pins 24 and 26 has been greatly exaggerated in the drawing to show the parts more clearly.

When pen 8 and pointer 10 are in position to display equal values on chart 14, that is, when the measured value of the variable is exactly equal to the set-point value, the pin 25 is axially aligned with the pin 22— that is, considering the geometric relations of imaginary lines drawn between and perpendicular to the pins, angle 22, 24, 26 is equal to angle 25, 24, 26. In this condition, the position of pin 25 is not affected by rotation of sector gears 20 and 21, so long as both gears are rotated by equal amounts in the same direction. However, if pointer 10 and gear 21 remain stationary, while pen 8 and gear 20 are moved, the angle 22, 24, 26 changes in value, while the angle 25, 24, 26 remains fixed. This moves pin 25 either up or down, depending upon the direction of motion of pen 8.

The upward or downward motion of pin 25 is transmitted through a link 29 to a pin-like part 30 which rides in a slot 31 diagonally disposed to link 29. In the drawing, the length of pin 30 is greatly exaggerated. Preferably, link 29 is substantially tangent to the arc through which pin 25 moves. Another link 32 is pivotably attached to link 29 at or near pin 30, so that as link 29 moves vertically, link 32 moves horizontally.

It may be seen that the position of link 32 is always the same whenever the measured value of the variable is the same as the set-point value, and that link 32 moves from this position, either to the left or to the right, whenever the measured value of the variable becomes different from the set-point value. Thus, the position of link 32 is an error signal, which corresponds to the difference between the measured value of the variable and the set point value. With slot 31 diagonally disposed in the direction shown, an upward movement of link 29, which may correspond to an increase in the value of the measured variable, moves link 32 toward the left. It will be seen later that this produces a direct acting controller. To provide inverse action when desired, slot 31 is arranged in a member 33 which may be rotated, preferably through an angle of 90°, after screws 34 and 35 have been loosened. When so rotated, the slope of slot 31 is in the opposite direction, so that an upward movement of link 29 moves link 32 to the right. This, in effect, changes the sign of the error signal, and thus provides inverse action. It will be appreciated that the angle of rotation of member 33 need not be exactly 90° in all cases. For example, if slot 31 is initially at an angle of 30° to the vertical, a rotation of 60° will change the sign of the error signal.

Link 32 is pivotably connected to the upper end of an arcuate lever 36, which may be called the "proportioning lever." The lower end of lever 36 is pivotably supported by a carriage 37 connected through a rod 38 to a bellows assembly 39, hereinafter more fully described. Bellows assembly 39 moves rod 38 and carriage 37 toward the left or toward the right, selectively, according to a function of a pneumatic pressure. Thus, each end of lever 36 is independently movable in a direction perpendicular to the plane of the lever, the top end being moved by link 32 in accordance with the error signal, and the bottom end being moved by carriage 37 in accordance with a function of a pneumatic pressure.

Compressed air from the supply source is provided through connection 40 to a relay valve 41. Compressed air passes through a restriction 42, connection 43, turret 44, and hollow arm 45 to a nozzle 46, located adjacent to and just inside the inner circumference of arcuate lever 36. A flapper 47, pivotably supported at 48 by a bracket 49 attached to arm 45, is movable relative to the tip of nozzle 46 to control the flow of air through the nozzle. When flapper 47 is brought very close to the tip of nozzle 46, the flow of air through the nozzle is impeded, and the air pressure in connections 45 and 43 increases. Conversely, as flapper 47 is moved away from nozzle 46, air flows more freely from the nozzle, and, since the supply of air to the nozzle is limited by restriction 42, the pressure in connections 43 and 45 decreases. Thus, the air pressure in connection 43 is controlled by the position of flapper 47 relative to the tip of nozzle 46. A small spring 50 biases flapper 47 toward the nozzle, which tends to reduce the flow of air therefrom and increase the pressure in connection 43. A conical portion 51 of flapper 47 normally engages a side of lever 36, as shown, and thereby flapper 47 is held slightly away from the tip of nozzle 46. Thus, the position of lever 36 controls the air pressure in connection 43.

The pressure in connection 43 acts upon a diaphragm 52 of the relay valve, and thereby pushes valve stem 53 toward the right, lifts the ball 54 slightly from its seat and allows air to enter the connection 55. Some of the air admitted to connection 55 passes by a conical section at the left-hand end of valve stem 53 and escapes to the atmosphere through opening 56. As the pressure in connection 43 increases, ball 54 is moved further from its seat, thus admitting more air to connection 55, and at the same time the conical portion of stem 53 moves closer to its seat, so that less air escapes through opening 56. Consequently, the pressure in connection 55 increases. Conversely, when the pressure in connection 43 decreases, ball 54 moves closer to its seat, and admits less air to connection 55, while more air escapes through opening 56, which permits the pressure in connection 55 to decrease. A movement of flapper 47 as small as 1 mil is sufficient to control the air pressure in connection 55 over the full range from 3 lbs. per sq. in. to 15 lbs. per sq. in. Thus, there is provided a very sensitive means for controlling the air pressure in connection 55 in correspondence with very small motions of lever 36.

The bellows assembly 39 comprises a large bellows 57 fixedly attached at one of its ends to the casing of the assembly, and attached at its other end to a movable disk 58. Rod 38 is attached to the center of disk 58, as shown, so that disk 58, rod 38 and carriage 37 all move together under the influence of air pressure within bellows 57. A small bellows 59, preferably coaxial with bellows 57, substantially surrounds rod 38 and thus seals the space inside bellows 57 against the leakage of air. A similar small bellows 60 is attached to the other side of disc 58 and to the right-hand side of the assembly casing, thus forming an air-tight chamber within the assembly 39 casing and substantially surrounding bellows 57. A spring 61 attached to disk 58 is provided to bias disk 58 to a predetermined position.

For adjusting the tension of spring 61, a doubly-threaded rotatable element 62 is provided, which engages the casing of assembly 39 and also engages a threaded member 63 attached to the right-hand end of spring 61.

The two sets of threads of member 62 are reversed in direction, so that as member 62 is turned in one direction, member 63 travels to the right, thus increasing the tension on the spring 61. The interior of bellows 60 is preferably vented to the atmosphere through a small opening 64. The interior of bellows 59 communicates with the atmosphere through an opening 65.

The space inside of bellows 57 is connected to the pressure controlled by relay valve 41 through a connection 55' which is connected to connection 55, preferably through the permanent interior connections of the controller. The air chamber inside the assembly casing, and substantially surrounding bellows 57, is connected to the same pressure by a connection 66, which may be an external connection as hereinafter explained, through an adjustable restriction, which may be an adjustable needle valve, shown schematically at 67.

For the purpose of explaining more simply the operation of bellows assembly 39, assume that valve 67 is completely closed, and that the chamber surrounding bellows 57 is vented to the atmosphere, so that the air pressure in this surrounding chamber remains constant. Now assume an error signal in accordance with which link 32 moves toward the right. This moves the upper end of lever 36 toward the right, and pushes flapper 47 away from nozzle 46. Consequently, the pressure in connection 55 and 55' decreases, and this decrease in pressure causes bellows 57 to collapse somewhat, thus moving carriage 37 to the left. The resulting movement to the left of the lower end of lever 36 permits flapper 47 to move toward nozzle 46, thus tending to increase the pressure in connections 55 and 55'. In other words, any motion of link 32 which tends to change the pressure in connection 55 is immediately followed by a movement of carriage 37 which tends to oppose this change, thus providing a negative feedback action. Since the flapper 47 moves less than 1 mil for a full scale pressure change, the point 51 may be considered an essentially stationary pivot for lever 36. Consequently, the movement of carriage 37 must be proportional to the movement of link 32, and consequently the pressure change in connection 55 is proportional to the value of the error signal. This provides proportional control.

The turret 44 is rotatable, and carries with it the arm 45, so that nozzle 46 and flapper 47 can be moved selectively to any position along the length of lever 36. If the conical portion 51 of flapper 47 contacts lever 36 near its upper end, a large movement of carriage 37, and consequently a large change in pressure, is necessary to balance a small movement of link 32. Conversely, if flapper 47 engages lever 36 near its lower end, a small movement of carriage 37, and consequently a small change in pressure, will balance a large movement of link 32. Thus, the movement of arm 45, by rotating turret 44, provides means for adjusting the proportional band, represented by the symbol S in the control action equation, over a wide range of values. For example, the value of S may thus be adjusted to any setting between 1% and 500% proportional band, it being understood that 100% proportional band means that a full scale movement of pen 8 across chart 14 will produce a full scale change in the pneumatic pressure in connection 55, for example, from 3 lbs. per sq. in. to 15 lbs. per sq. in.

Preferably, the center of turret 44, or the axis about which arm 45 rotates, is located substantially at the center of curvature of arcuate lever 36, and the axis of rotation is perpendicular to the normal or zero-signal plane of the lever. To facilitate adjusting the position of arm 45, another arm 68 extends from the other side of turret 44, and has at its extremity an index marker 69 which cooperates with a scale 70 suitably calibrated to indicate the proportional handsetting (see Fig. 6).

Now, assume that valve 67 is opened slightly and that the chamber surrounding bellows 57 is otherwise airtight, so that the pressure in the air chamber surrounding bellows 57 can gradually become equal to the pressure inside the bellows. As this happens, disk 58 tends to return to its neutral position, and if the error signal remains, a larger change in pneumatic pressure in connections 55 and 55' is necessary to balance the error signal. This action may be better understood by referring to Fig. 3.

Figure 3:
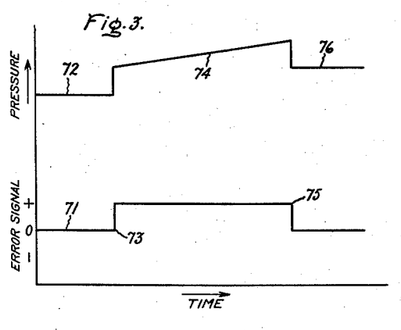
Fig. 3 is a diagram illustrating proportional plus reset control action.

In Fig. 3, the curve 71 represents an error signal varying with time in the manner shown. The curve 72 represents the pressure in connections 55, 55' and 66. Initially, the error signal has a zero value, and the pressure in the connections has some arbitrary value $P_0$. Both link 32 and carriage 37 are in their neutral positions, and proportioning lever 36 is substantially vertical.

At point 73, a positive error signal occurs, as is indicated by the sharp rise in curve 71. This error signal causes link 32 to move toward the left, thereby moving flapper 47 by a very slight amount to provide an increase in the pneumatic pressure in connections 55 and 55' which moves carriage 37 toward the right and amount sufficient to balance substantially the movement of link 32. Consequently, there is a sharp rise in the pressure, represented by the sharp rise in curve 72 which is proportional to the error signal.

This increased pressure in connections 55, 55' and 66 causes air to flow through valve 67, thereby slowly increasing the pressure in the air chamber surrounding bellows 57. However, since the error signal remains unchanged, the position of carriage 37 must also remain substantially unchanged—that is, the carriage moves only enough to adjust the position of flapper 47 by less than 1 ml—which requires that a substantially constant pressure differential be maintained between the inside of bellows 57 and the air chamber surrounding it. In consequence, as the pressure in the surrounding air chamber increases, the pressure inside bellows 57 must increase by a like amount, so that the pressure in connections 55, 55' and 66 continues to increase at a steady rate represented by the sloping portion 74 of curve 72.

At point 75, process conditions change so that the error signal returns to zero. Since link 32 now returns to its neutral position, carriage 37 must also return substantially to its neutral position, which requires that the pressure inside bellows 57 should assume the same value as the pressure in the air chamber surrounding the bellows. When this happens, no more air flows through valve 67, and the lever 36 returns to its vertical position, whereupon no further change in pressure takes place. However, the final pressure in connections 55, 55' and 66, represented by portion 76 of curve 72, is greater than the initial pressure $P_0$, by an amount equal to the increase in pressure in the air chamber surrounding bellows 57 during the time that the error signal was positive.

It may be noted that the pressure thus provided is a function of the error signal, having a term proportional to the value of the error signal, and having another term proportional to the time integral of the value of the error signal. Thus, proportional plus reset control action is provided. The rate at which the pressure inside the air chamber surrounding bellows 57 increases or decreases depends upon the adjustment of needle valve 67. Consequently, the adjustment of this valve provides a means for adjusting the constant R of the control action equation. The constant R is preferably adjustable from .02 to 10 "repeates" per minute.

In many cases, proportional plus reset control action is satisfactory. When this is the case, a connection may be made from connection 55 directly to the servo-motor or valve 4 of Fig. 1, and the rate unit hereinafter described may be omitted.

When proportional plus reset plus rate action is desired, a second bellows assembly 77 is provided as shown in Fig. 2. The bellows assembly 77 comprises coaxial outer bellows 78 and inner bellows 79. The casing of the assembly 77 forms an air chamber substantially surrounding the outer bellows 78. Additional air spaces include the space between the two bellows 78 and 79, and the space inside the inner bellows 79. One end of each bellows 78 and 79 is fixedly attached to the casing of the assembly. The other end of each bellows is attached to a common movable disk 80 having a rod-like inner portion 81 coaxial with bellows 79, as shown. A spring 82 is preferably provided to partially neutralize the spring tension of the bellows. In a preferred embodiment, spring 82 provides about 90% of the total spring force, and the bellows only 10%. A valve stem 83 is aligned with the extended axis of bellows 79, and one end of stem 83 engages the portion 81 of the common movable part 80 of the two bellows. A rubber diaphragm 84 is provided about stem 83 as shown, to seal the space inside bellows 79 while permitting small axial movements of stem 83.

The air chamber surrounding bellows 78 is supplied with pneumatic pressure from connection 55 through a connection 85. When this pressure increases, part 80 is moved toward the right, thereby pressing valve stem 83 against the ball 86 and partially raising the ball from its seat. This permits compressed air supplied through connection 87 to enter the output connection 88. A portion of this air also passes the conical portion at the left-hand end of valve stem 83 and escapes to the atmosphere through the opening 89.

As the pressure in connections 55 and 85 increases, ball 86 is moved further from its seat, thus admitting more air to connection 88, while the conical portion of the valve stem 83 moves closer to its seat, so that less air may escape through opening 89. This raises the pressure in connection 88. Conversely, a decrease in the pressure in connection 85 allows the valve stem 83 to move toward the left, thereby decreasing the pressure in connection 88. A very small movement of stem 83 is sufficient to change the pressure in connection 88 over the full scale range from 3 lbs. per sq. in. to 15 lbs. per sq. in.

The pressure in connection 88 is also supplied to the inside of inner bellows 79 through the passageway 90. This same pressure is supplied to the space between the two bellows, after a time delay, through a connection 91 including an adjustable restriction, which may be a needle valve as shown schematically at 92.

Assume that valve 92 is opened so wide as to provide substantially no restriction to the flow of air. Then the pressure inside bellows 79, the pressure in the space between the two bellows, and the pressure in connection 88 will all be substantially equal. This pressure is also equal to the pressure in connection 85, since any difference in these pressures causes part 80 to move toward the left or toward the right, thus increasing, or decreasing as necessary, the pressure in connection 88.

Now, assume that valve 92 is partially closed, and that there is an increase in the pressure supplied through connection 85. This causes part 80 to move toward the right, thereby lifting ball 86 further from its seat and increasing the pressure in connection 88. The pressure likewise increases in the space within bellows 79, but the pressure in the space between the two bellows cannot increase immediately, because the flow of air is delayed by valve 92. Consequently, the pressure in connection 88 must increase to a value greater than the pressure in connection 85 in order to balance the pressure forces on the two sides of part 80. In practice, the bellows may be so proportioned for example that the initial change in pressure in connection 88 is at least 10 times the change in pressure in connection 85.

The pressure change in connection 88 causes air to flow through valve 92, so that the pressure in the space between the bellows gradually rises. As the pressure in this space rises, part 80 moves back toward the left, thereby decreasing the pressure in connection 88 just enough to maintain the forces acting on opposite sides of part 80 substantially equal. This action may be better understood by referring to the diagram shown in Fig. 4 of the drawing.

Figure 4:
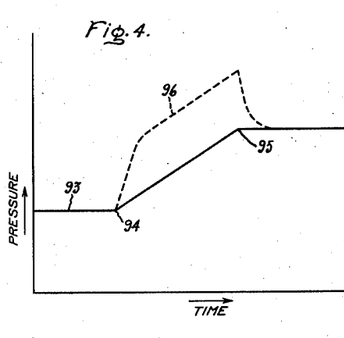
Fig. 4 is a diagram illustrating rate control action.

In Fig. 4, the solid-line curve 93 represents the pneumatic pressure supplied through connection 85. Assume that this pressure begins to increase at point 94, increases at a steady rate until point 95 is reached, and then remains constant at the new value. The pressure in connection 88 will follow the broken-line curve 96. As the pressure in connection 85 increases, the pressure in connection 88 at first increases at a much greater rate, since the area of part 80 upon which this pressure initially acts is much smaller than the area of part 80 upon which the pressure from connection 85 acts. However, as the pressure in connection 88 increases, an increasing amount of air flows through valve 92, thus gradually raising the pressure in the space between the bellows 78 and 79. After a short time, the increase in pressure in the inter-bellows space occurs at the same rate as the increase in pressure in connection 88, and thereafter the pressures acting on the two sides of part 80 continue to increase at equal rates. Therefore, after a sharp initial rise, curve 96 has the same slope as curve 93, but the value of the pressure in connection 88 is greater than the pressure in connection 85 by an amount proportional to the rate of change of the pressures. Thus, a rate function is added which is proportional in value to the time derivative of the error signal.

At point 95, the pressure supplied by connection 85 stops increasing. The pressure in connection 88, however, and hence the pressure inside bellows 79, is greater than the pressure supplied through connection 85, while the pressure in the space between bellows 78 and 79 is smaller than the input pressure. Hence, air continues to flow through valve 92 until the pressure in the inter-bellows space equals the pressure in connection 88. As the pressure in the inter-bellows space rises, the pressure within bellows 79 must decrease, to keep the forces acting on opposite sides of part 80 in balance. Thus, immediately after point 95 of curve 93 is reached, the pressure in connection 88 begins to fall and continues to drop until the pressures in connections 85 and 88 become equal.

Since the pressure in connection 85 approximates a proportional plus reset control action, and since the bellows assembly 77 adds to this pressure a rate term, the pressure in connection 88 satisfactorily approximates proportional plus reset plus rate control action. This pressure is supplied to the pneumatically operated servomotor or control valve through suitable air connections. The coefficient T of the control action equation has a value which depends upon the adjustment of needle valve 92. This constant is preferably adjustable from .02 to 12 minutes.

The amount of initial pressure increase in output connection 88 upon a sudden pressure increase in connection 85 is determined by the ratio of the cross-sectional area of bellows 78 to the difference between the cross-sectional area of bellows 79 and the effective area of diaphragm 84. This ratio determines the initial gain of the rate unit for sudden signal changes. A large gain is usually desirable to provide large corrective action upon sudden error signal changes. In our improved controller, the gain of the rate unit can be made substantially larger than in comparable prior devices, because the pressure on diaphragm 84 neutralizes some of the pressure on disk 80, and thus reduces the effective cross-sectional area of bellows 79. The rate unit gain can be increased still further, if desired, by increasing the area of diaphragm 84.

Figure 5:
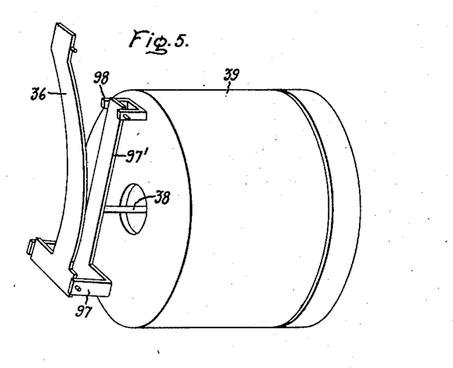
Fig. 5 is a perspective view showing an alternative construction for a part of the apparatus shown in Fig. 2.

Fig. 5 shows an alternative carriage arrangement for supporting the proportioning lever 36. In place of the carriage 37 of Fig. 2, in the Fig. 5 arrangement a carriage 97 is provided, which has a lever-like portion 97' pivoted at 98 in a suitable fixed bracket, which may be attached to bellows assembly 39, for example. The rod 38, attached to the movable part of the bellows assembly, engages an intermediate portion of the carriage lever, and thus moves carriage 97 toward the left or the right, selectively, in correspondence with movement of the movable part of the bellows assembly.

Figures 6, 7:
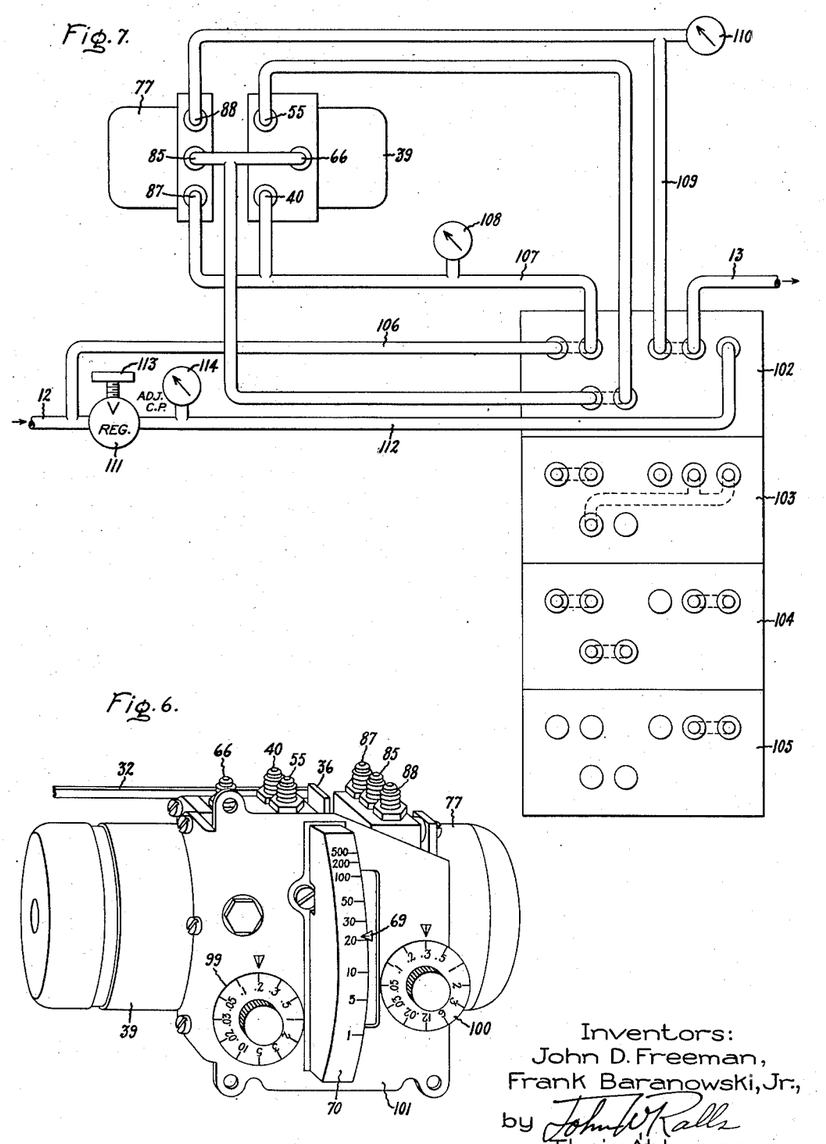
Fig. 6 is a perspective view showing a preferred form of our improved pneumatic controller.
Fig. 7 is a schematic diagram of air connections preferably used with our controller to obtain proportional plus reset plus rate action.

Fig. 6 is a perspective view showing a preferred embodiment of the bellows assemblies. The proportional plus reset bellows assembly 39 is shown at the left, while the rate action bellows assembly 77 is shown at the right. The link 32 positions the top end of the proportioning lever 36, as has been described. The air connections are shown at the top of the assembly. These are connected together by external piping, preferably in the manner hereinafter described in connection with Fig. 7 and Fig. 8. The index 69 at the end of arm 68 is conveniently located for adjustment relative to the scale 70, which indicates the percent proportional band setting. The calibrated dial 99 is connected to the needle valve 67, and indicates the value of the reset rate adjustment. A similar calibrated dial 100, connected to needle valve 92, provides a convenient means for making the rate time adjustment. The entire assembly may be mounted upon, and held together by, a mounting bracket 101.

Fig. 7 shows the preferred air connections for proportional plus reset plus rate control action. The bellows assemblies 39 and 77 are shown at the upper left-hand corner of the figure, with their air connections numbered as in Figs. 2 and 6. A selector switch, schematically illustrated at the lower right-hand corner of the figure, has four connection arrangements, indicated by dotted lines in the drawing, which may be selectively switched into position. The connections shown at 102 are used for automatic control of the output pressure as hereinbefore explained. The connections shown at 103 are used when manual control of the output pressure is desired. The connections shown at 104 are used for testing the controller. The connections shown at 105 are used when the controller must be removed or partially disassembled for servicing. The selector switch referred to in Figures 7 and 8 may be a four-position rotary valve member—generally of the type shown in Figure 2 of Eckman Patent 2,369,887 and the schematic showing of the switch in both Figures 7 and 8 merely illustrates the different connections of the fluid pressure lines that may be established by manipulation of the switch to each of its four positions, with the different connections established for Figures 7 and 8 being easily provided for by minor modifications in valve structure. The structure of this valve member forms no part of the subject invention and, since the valve is of a type that is well known in the art, further illustration and description of the valve are unnecessary and have been omitted in the interests of brevity.

For automatic control, the selector switch is positioned to bring the connections shown at 102 into engagement. Compressed air is supplied through connections 12, 106, and 107 to connections 40 and 87 of the controller. The value of this supply pressure is indicated by a conventional pressure gage 108. Connections 55, 66 and 85 are connected together as shown to make all parts of the controller operative. The connection 88 is connected through line 109 to the output connection 13, which is connected to the pneumatically operated servomotor or control valve which controls some agency affecting the process. The value of this output pressure is indicated by a conventional pressure gage 110.

When it is desired to control the output pressure manually, the selector switch is turned to bring connections 103 into operation. Connection 55 of the controller is now disconnected from connections 66 and 85, so that the relay valve no longer has any effect upon the pressures in other parts of the system except the pressure inside bellows 57 which is permanently connected to the relay valve through internal connection 55' as hereinbefore explained. Instead, connections 85, 66 and 13 are connected to the compressed air supply 12 through a pressure regulating valve 111 and connection 112. Valve 111 has a manual adjustment 113 by means of which the pressure on its output side can be adjusted manually to any desired value. This pressure value is indicated by a conventional pressure gage 114. With these connections, the pressure in line 13 is equal to the pressure in line 112, so that the output pressure can be varied at will by means of manual adjustment 113. It should be noted that this arrangement also supplies the same output pressure to the controller bellows assemblies, except the space inside bellows 57, so that no great change in the bellows pressure is necessary when the circuit is switched back to automatic control. Since the pressure inside bellows 57 remains under control of the relay valve, the flapper tends to keep within the operating range of positions relative to the nozzle. This makes possible a smooth transition from manual to automatic control, without undesirable fluctuations which might upset the controlled process, by merely changing the position of the transfer switch, without altering the set point or making other manual adjustments.

For testing the controller, the selector switch is turned to make the connections illustrated at 104. With these connections, ouput connection 13 is connected directly to line 112, and thus controlled by manual adjustment 113. The controller is connected as for normal operation, except that its output air connection 88 is not connected to the pneumatically operated servomotor which controls the process conditions. The output pressure of the controller can be noted on gage 110 as tests are made.

When the controller is to be removed or partially disassembled for servicing, the selector switch is turned to make the connections shown at 105. Note here that no air is supplied to the controller, so that it may be completely removed without affecting operation of the process under manual control.

Figure 8:
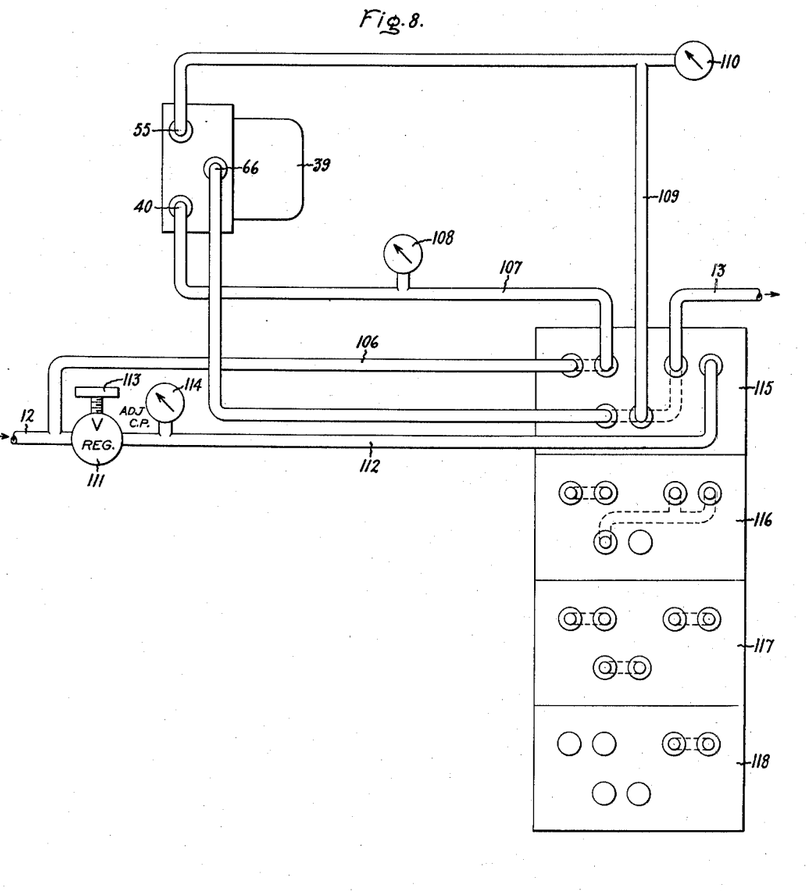
Fig. 8 is a schematic diagram of the preferred air connections for our controller to obtain proportional plus reset action.

When only proportional plus reset control action is desired, the preferred air connections to be used are shown in Fig. 8. The arrangement is generally the same as that shown in Fig. 7, except that bellows assembly 77, the rate unit, and its associated connections are omitted. Also, the selector switch connections are somewhat different. The connections for automatic control are shown at 115, those for manual control at 116, those for test at 117, and those for service at 118.

It will be understood that our invention is not limited to the specific embodiments herein illustrated and described, and that the following claims are intended to cover all changes and modifications which do not depart from the true spirit and scope of the invention.

What we claim as new and desire to secure by Letters Patent of the United States is:

1. A pneumatic controller comprising first and second sector gears independently rotatable about a common fixed axis, means for adjusting the angular position of one of said sector gears in correspondence with the values of a measured variable, means for adjusting the angular position of the other of said sector gears to a predetermined set value, an angle-shaped member pivotably supported at its corner by said second sector gear so that a first end of said angle-shaped member is movable along an arc passing substantially through the extended common axis of said gears, a first link connecting the second end of said angle-shaped member to said first sector gear, a second link having one end pivotally connected to said first end of said angle-shaped member, a member having a slot diagonally disposed to said second link, a part of said second link riding in said slot, a third link pivotably connected to said second link, a nozzle, connections for supplying compressed air to said nozzle, a flapper movable relative to said nozzle to control the flow of air therethrough, relay valve means controlling the value of a pneumatic pressure in accordance with the flow of air through said nozzle, an arcuate lever having first and second ends independently movable perpendicular to the plane of the lever, said flapper engaging said arcuate lever whereby the position of the lever controls the value of said pneumatic pressure, said third link being pivotably connected to the first end of said lever, and means positioning the second end of said lever in accordance with a function of said pneumatic pressure.

2. A pneumatic controller for controlling the value of a pneumatic pressure as a function of a variable signal, comprising an arcuate lever having first and second ends independently movable perpendicular to the plane of the lever, means positioning the first end of said lever in accordance with values of the variable signal, means positioning the second end of said lever in accordance with a function of the pneumatic pressure, an arm rotatable substantially about the center of curvature of said arcuate lever in a plane substantially parallel to said lever, a nozzle at one end of said arm adjacent to said lever, connections for supplying compressed air to said nozzle, a flapper pivoted on said arm and movable relative to said nozzle to control the flow of air therefrom, means biasing said flapper toward said nozzle to reduce said flow of air, said flapper resting against said lever and thereby normally being held slightly away from said nozzle, whereby the position of said lever controls the flow of air from said nozzle, the position of said flapper along the length of said lever being variable by rotation of said arm, thereby providing means for adjusting the proportional band of the controller, and relay valve means controlling the value of said pneumatic pressure in accordance with the flow of air from said nozzle.

3. A pneumatic controller for controlling the value of a pneumatic pressure as a function of an input variable, comprising a bellows assembly having a part movable as a function of the controlled pressure, a carriage connected for movement in correspondence with the movable part of said bellows assembly, an arcuate lever pivotably supported at one end by said carriage, the plane of said lever being perpendicular to the direction of movement of said carriage, whereby said one end of said lever is moved perpendicular to the plane of the lever by movement of said carriage as a function of the controlled pressure, said lever being pivoted so that its other end is also movable perpendicular to the plane of the lever, means including a link attached to said other end of the arcuate lever for positioning said other end in accordance with values of the input variable, an arm rotatable substantially about the center of curvature of said arcuate lever in a plane substantially parallel to said lever, a nozzle at one end of said arm adjacent to and inside the inner circumference of said lever, connections for supplying compressed air to said nozzle, said connections including a restriction limiting the flow of air to the nozzle, a flapper pivoted on said arm for movement relative to said nozzle to control the flow of air therefrom, means biasing said flapper toward said nozzle to reduce said flow of air, said flapper resting against a side of said lever and thereby normally being held slightly away from said nozzle, whereby the position of said lever controls the flow of air from said nozzle, the position of said flapper along the length of said lever being variable by rotation of said arm, thereby providing means for adjusting the proportional band of the controller, and relay valve means controlling the value of said pneumatic pressure in accordance with the flow of air from said nozzle.

4. A pneumatic controller for controlling the value of a pneumatic pressure as a function of an input variable, comprising a first bellows fixed in position at one end and movable at the other end, an air chamber substantially surrounding said first bellows, connections for supplying the controlled pneumatic pressure to the inside of said first bellows, connections including an adjustable restriction for supplying said pressure to said air chamber after a time delay depending upon the adjustment of said restriction, a rod attached to the movable end of said first bellows, a spring attached to the movable end of said first bellows, means for adjusting the tension of said spring, second and third bellows substantially enclosing said rod and said spring respectively, means for admitting atmospheric pressure into said second and third bellows, a carriage connected for movement with said rod, an arcuate lever pivotally supported at one end by said carriage, the plane of said lever being perpendicular to the direction of movement of said carriage whereby said one end of said lever is moved perpendicular to the plane of the lever by movement of said carriage as a function of the controlled pressure, said lever being pivoted so that its other end is also movable perpendicular to the plane of the lever, means including a link attached to said other end of the arcuate lever for positioning said other end in accordance with values of the input variable, an arm rotatable substantially about the center of curvature of said arcuate lever in a plane substantially parallel to said lever, a nozzle at one end of said arm adjacent to and inside the inner circumference of said lever, connections for supplying compressed air to said nozzle, a flapper pivoted on said arm for movement relative to said nozzle to control the flow of air therefrom, means biasing said flapper toward said nozzle to reduce said flow of air, said flapper resting against a side of said lever and thereby normally being held slightly away from said nozzle, whereby the position of said lever controls the flow of air from said nozzle, the position of said flapper along the length of said lever being variable by rotation of said arm, thereby providing means for adjusting the proportional band of the controller, and relay valve means controlling the value of said pneumatic pressure in accordance with the flow of air from said nozzle.

5. The combination defined by claim 2 wherein the other end of said arm extends beyond the axis about which the arm rotates to form a handle portion which may be manually manipulated to change the angular position of said arm.

6. The combination defined by claim 5 wherein the outer extremity of said handle portion is formed into an indicating pointer and an arcuate scale is provided to cooperate with said pointer to give a visual indication of the proportional band setting of said controller.

References Cited in the file of this patent

UNITED STATES PATENTS

| | | |
|---|---|---|
| 2,284,795 | Belaef | June 2, 1942 |
| 2,301,301 | Mallory | Nov. 10, 1942 |
| 2,310,415 | Frymoyer | Feb. 9, 1943 |
| 2,360,889 | Philbrick | Oct. 24, 1944 |
| 2,380,858 | McMahon | July 31, 1945 |
| 2,429,695 | McGrath | Oct. 28, 1947 |
| 2,461,026 | Bilyeu | Feb. 8, 1949 |
| 2,508,881 | Arnold | May 23, 1950 |
| 2,548,943 | Burdick | Apr. 17, 1951 |
| 2,593,129 | Fischer | Apr. 15, 1952 |
| 2,612,870 | Roetter | Oct. 7, 1952 |
| 2,631,570 | Bowditch | Mar. 17, 1953 |
| 2,653,578 | Moore | Sept. 29, 1953 |
| 2,658,516 | Luppold et al. | Nov. 10, 1953 |
| 2,729,222 | Dickey | Jan. 3, 1956 |
| 2,731,023 | Panich | Jan. 17, 1956 |
| 2,771,897 | Bailey | Nov. 27, 1956 |

UNITED STATES PATENT OFFICE
CERTIFICATE OF CORRECTION

Patent No. 2,829,663                                                            April 8, 1958

John D. Freeman et al.

It is hereby certified that error appears in the printed specification of the above numbered patent requiring correction and that the said Letters Patent should read as corrected below.

Column 1, line 51, for "controlled" read -- controller --; column 6, line 25, for "and" read -- an --; line 37, for "ml" read -- mil --; line 70, for "repeates" read -- repeats --.

Signed and sealed this 30th day of September 1958.

(SEAL)
Attest:

KARL H. AXLINE
Attesting Officer

ROBERT C. WATSON
Commissioner of Patents